United States Patent
Gurevich et al.

(10) Patent No.: US 12,497,686 B2
(45) Date of Patent: Dec. 16, 2025

(54) SUB-CRITICAL NUCLEATION PROCESS FOR MAKING STABLE CLUSTERS OF ATOMS HAVING SUBCRITICAL SIZE

(71) Applicant: HE Carbon Supercap Limited, London (GB)

(72) Inventors: Sergey Gurevich, London (GB); Vladimir Kozhevin, London (GB); Denis Yavsin, London (GB); Alexei Platonov, London (GB); Alexander Atrashchenko, London (GB); Michael Kohl, London (GB)

(73) Assignee: WE53UK LIMITED, London (GB)

( * ) Notice: Subject to any disclaimer, the term of this patent is extended or adjusted under 35 U.S.C. 154(b) by 965 days.

(21) Appl. No.: 17/434,204

(22) PCT Filed: Feb. 27, 2020

(86) PCT No.: PCT/GB2020/050470
§ 371 (c)(1),
(2) Date: Jul. 13, 2022

(87) PCT Pub. No.: WO2020/174245
PCT Pub. Date: Sep. 3, 2020

(65) Prior Publication Data
US 2025/0043410 A1    Feb. 6, 2025

(30) Foreign Application Priority Data
Feb. 27, 2019    (GB) .................................... 1902657

(51) Int. Cl.
*C23C 14/32* (2006.01)
*B82Y 40/00* (2011.01)
*C01B 32/15* (2017.01)
*C23C 14/06* (2006.01)

(52) U.S. Cl.
CPC .............. *C23C 14/32* (2013.01); *B82Y 40/00* (2013.01); *C01B 32/15* (2017.08); *C23C 14/0605* (2013.01)

(58) Field of Classification Search
CPC ..... C23C 14/32; C23C 14/0605; C01B 32/15; B82Y 40/00
See application file for complete search history.

(56) References Cited

U.S. PATENT DOCUMENTS

| | | | |
|---|---|---|---|
| 5,300,203 A | * | 4/1994 | Smalley ................ C01B 32/154 423/445 B |
| 2012/0052513 A1 | | 3/2012 | Thalappil et al. |

FOREIGN PATENT DOCUMENTS

| | | |
|---|---|---|
| CN | 108325523 A | 7/2018 |
| JP | S60113418 A | 6/1985 |
| JP | H03158460 A | 7/1991 |

OTHER PUBLICATIONS

Dunk, et al., "Closed network growth of fullernes," Nature Communications, vol. 3, No. 1 (May 22, 2012) XP055720016.
(Continued)

*Primary Examiner* — Michael P Wieczorek
(74) *Attorney, Agent, or Firm* — Saul Ewing LLP

(57) ABSTRACT

A method of making stable clusters of atoms that are of subcritical size, in which rapid expansion and rapid cooling of a vapor cloud takes place in which the vapor conditions or parameters are controlled so that multiple stable clusters, each with a size less than the critical size and formed from sub-critical nucleation, are condensed.

10 Claims, 7 Drawing Sheets

(56) References Cited

OTHER PUBLICATIONS

Stein, et al., "Cluster beam sources: Predictions and limitations of the nucleation theory," Surface Science, vol. 156, pp. 44-56 (Jun. 3, 1985) XP026042117.

* cited by examiner

SUB-CRITICAL NUCLEATION PROCESS FOR MAKING STABLE CLUSTERS OF ATOMS HAVING SUBCRITICAL SIZE

BACKGROUND OF THE INVENTION

1. Field of the Invention

The field of the invention relates to a sub-critical nucleation process for making stable clusters of atoms that are of subcritical size, and the structure, properties and applications of materials made from these clusters. For carbon, that implies clusters that form from sub-critical size nuclei, where these nuclei are less than 1 nm in size, and the nucleation process occurs in conditions of temperature and pressure where the critical size for carbon is 1 nm.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Nanotechnology, defined as the manipulation of matter with at least one dimension sized from 1 nm to 100 nm, has been the subject of intense research and commercial interest in recent years. Matter has special and unusual properties in this realm and that a vast array of new materials and devices are being created using nanotechnology. Nanomedicine, nanoelectronics, nanomaterials are just some of the diverse application areas.

The use of laser ablation to create carbon nanotubes has been known for many years; a graphite block is placed inside an oven with a laser pointed at it, and argon gas is pumped along the direction of the laser point. The oven temperature is approximately 1200° C. As the laser ablates the target, a carbon plasma forms and then condenses; multiple clusters of atoms, each arranged as a carbon nanotube, form during the condensation process and are carried by the gas flow onto a cool copper collector. See Guo T, Nikolaev P, Rinzler D, Tomanek D T, Colbert D T, Smalley R E (1995). "Self-Assembly of Tubular Fullerenes". J. Phys Chem 99 (27): 10694-7.

Fullerenes like C60, C70 and others can also be obtained by the use of laser ablation [H. Kroto et. al., Nature 318, 162-163 (1985)]. However, fullerenes and nanotubes, being a stable allotropic modification of carbon, require a relatively long time for their formation to occur under quasi-equilibrium conditions. This is a fundamental difference from the mode of formation of subcritical size nanoclusters, for which non-equilibrium conditions and short formation time are essential.

It has however been assumed that the growth of stable carbon clusters in a cooling carbon vapour cloud is possible when the nuclei (a) have an over-critical size (e.g. a size greater than 1 nm) or (b) are, like C60, inherently stable. On the other hand, little attention has been given to sub-critical nuclei that are inherently unstable (i.e. almost instantaneously returning carbon atoms to the gas phase). Thus, the possibility of, in some manner, preserving these sub-critical nuclei so that they can be collected and formed into industrially useful materials has not been considered. 'Sub-critical nucleation' occurs at the initial stage of the phase transition from the plasma gas phase to the solid phase; it is when inherently unstable nuclei in the plasma that are smaller than the critical size start to form; because these sub-critical nuclei are highly unstable, the traditional understanding is that only if and when they reach and exceed the critical size can they become stable and hence form useful materials. Note that the term 'critical size' means the cluster size for which the minimum energy required to create that cluster of atoms reaches a maximum; and hence 'subcritical size' is a size smaller than that 'critical size'. For carbon, at specific pressure and temperature conditions, this is 1 nm. The atoms may be carbon, or indeed other substances, such as silicon (which has a critical size generally close to carbon).

An analysis of the vapor condensation literature suggest that it has been assumed that the expansion and cooling of the gas vapor leads, after termination of the initial stage, to the complete and total destruction of any and all nuclei or clusters of sub-critical size that are formed from a sub-critical nucleation process. Nuclei or clusters formed by a sub-critical nucleation process have therefore been assumed to be so unstable as to be incapable of being made in any manufacturing process that yields useful, stable, sub-critical size clusters.

The explanation for this instability is the following: in general, during the initial stage of vapour condensation, clusters of atoms with a subcritical size which appear in the hot and high-density vapor cloud are highly unstable and they appear and disappear quickly, due to atoms being exchanged with the vapor phase. The possibility of creating stable sub-critical size clusters (e.g. sub-nano or sub 1 nm size clusters, where the atoms are carbon atoms) by altering the vapour conditions so that sub-critical nuclei that would normally be entirely destroyed are instead preserved, and can hence be collected and used, has been over-looked in favour of the intense and sustained research and development in the nanotechnology domain-namely the domain which deals with over-critical size carbon clusters (e.g. over 1 nm in size for carbon).

This invention overturns the long-established view that stable sub-critical size clusters, i.e. clusters of atoms of less than the relevant sub-critical size and that are formed from a sub-critical nucleation process, cannot be made by altering the vapour conditions so that sub-critical nuclei that would normally be entirely destroyed are instead preserved.

This specification describes a manufacturing process for the creation of stable sub-critical size clusters, despite their creation in a sub-critical nucleation process, a theoretical model that explains the conditions for the formation of these stable sub-critical size clusters, and the structure, properties and a range of applications for these sub-critical size clusters.

SUMMARY OF THE INVENTION

The invention is a method of making stable clusters of atoms that are of subcritical size, in which rapid expansion and rapid cooling of a vapor cloud takes place in which the vapor conditions or parameters are controlled so that multiple stable clusters that are formed in a sub-critical nucleation process, each with a size less than the critical size, are condensed. The method, in essence, alters the vapour conditions or parameters so that sub-critical nuclei that would normally be entirely destroyed are instead preserved. These clusters are then formed into materials with useful properties. Further details are in the appended Claims section.

A note on terminology:

A "Sub-Critical Cluster" refers (whether capitalised or not) to a single cluster or group of atoms formed by a sub-critical nucleation process—e.g. the process that would normally result in the complete destruction of that cluster. The cluster is therefore the solid form of the sub-critical nuclei, which can be thought of as being in the gas phase. The cluster will generally remain in size below the critical size for that specific element, once cooled and formed into a useful material, although it may also exceed that critical size. So, for carbon, we are dealing with clusters that are individually, typically, in the range or 0.3 or 0.4 nm to 0.7 nm. The clusters in the useful materials are typically within this size range, but they can also exceed it, for example reaching 1.5 nm in size.

A "Sub-Nano Cluster" refers (whether capitalised or not) to a single cluster or group of atoms of less than 1 nm sub-critical size formed by a sub-critical nucleation process—e.g. the process that would normally result in the complete destruction of that cluster. Because the critical size for carbon is 1 nm in the plasma vapour cloud (although it varies depending on the precise temperature and pressure conditions in the plasma vapour cloud), carbon sub-critical clusters will generally also be sub-nano clusters since, as noted above, they generally fall within the 0.3 or 0.4 nm to 0.7 nm size range.

A "Nano-Cluster" refers (whether capitalised or not) to a single cluster or group of atoms formed by a sub-critical nucleation process—e.g. the process that would normally result in the complete destruction of that cluster, where the cluster may be less than the 1 nm in size, and may also be larger than 1 nm in size; a nano-cluster may also refer to a cluster that is of sub-critical size, as well as a cluster that is over-critical in size. A 'nano-cluster' material' is hence a material made of clusters that may each be wholly sub-critical in size, or partly sub-critical and partly over-critical in size, or wholly over-critical in size. A carbon 'nano-cluster' material' is hence a material made of carbon clusters that may each be wholly sub-critical in size, or partly sub-critical and partly over-critical in size, or wholly over-critical in size. For the materials we have studied, the carbon clusters are predominantly in the 0.3 or 0.4 nm to 0.7 nm size range, but, as noted above, there may be some clusters falling outside of that range, for example at the 1.5 nm size. We may refer to carbon based nano-clusters as 'nano carbon', or 'nC'.

We use the word "Structure" (whether capitalised or not) principally in the context of the arrangement of atoms that form a single cluster—e.g. the sub 1 nm carbon cluster. As we will describe later in this specification, for a stable carbon sub-nano cluster, molecular dynamical modelling indicates that one possible Structure is a disordered, amorphous arrangement of 64 carbon atoms. A single cluster may well have a significantly different number of carbon atoms (significantly less than 64, or more). We can however exclude the well known C60 fullerene allotrope from the scope of what we mean by a disordered, amorphous sub-critical cluster since (a) it is not a disordered, amorphous structure and (b) it is not understood as being formed from a sub-critical nucleation process that would normally result in the complete destruction of that cluster.

And we use the term "Material" (whether capitalised or not) to refer to where there are lots of these clusters together. So, in the manufacturing process we will describe, then a powder or thin film made up of many thousands of these sub-critical clusters is made; we refer to this as 'Material'.

And we use the term 'stable' in the common meaning of that term, namely not significantly likely to alter in the conditions in which it is normally to be used. More strictly, one might say 'meta-stable'—e.g. stable other than in extreme conditions, e.g. of heat or pressure and we will use the term 'stable' in that sense.

Generalising, we will use the term "nano-cluster" in the general sense to refer to a group or cluster of atoms that can be either above or below the sub-critical size. A "nano-cluster material" is a material made up of multiple clusters of atoms; some or all of these clusters may each be smaller than the critical size; some or all of these may be larger than the critical size. So for a "carbon nano-cluster material", the clusters of stable atoms that make up the material may each be smaller than the 1 nm critical size, or larger, or a mix of the two. A "sub-nano-cluster material" is made up of clusters of stable atoms that are predominantly, or (in the limit) exclusively each smaller than the critical size. Where the atoms are carbon, then the critical size is 1 nm, and we refer then to the specific case of a "carbon sub-nano-cluster material", which is made up of stable clusters of carbon atoms that are predominantly, or (in the limit) exclusively each smaller than the 1 nm critical size.

BRIEF DESCRIPTION OF THE DRAWINGS

FIG. 1a is STM image of a carbon material deposited as a thin film on a substrate.

FIG. 1b is a surface profile taken by STM along the green line shown in FIG. 1a.

FIG. 1c is STM image of a single carbon cluster of the carbon material positioned on smooth surface of Highly Ordered Pyrolithic Graphite.

FIG. 1d is a surface profile taken by STM along the green line shown in FIG. 1c. The size of the cluster is 0.4 nm.

DETAILED DESCRIPTION

Figures 1A, 1B, 1C, 1D:
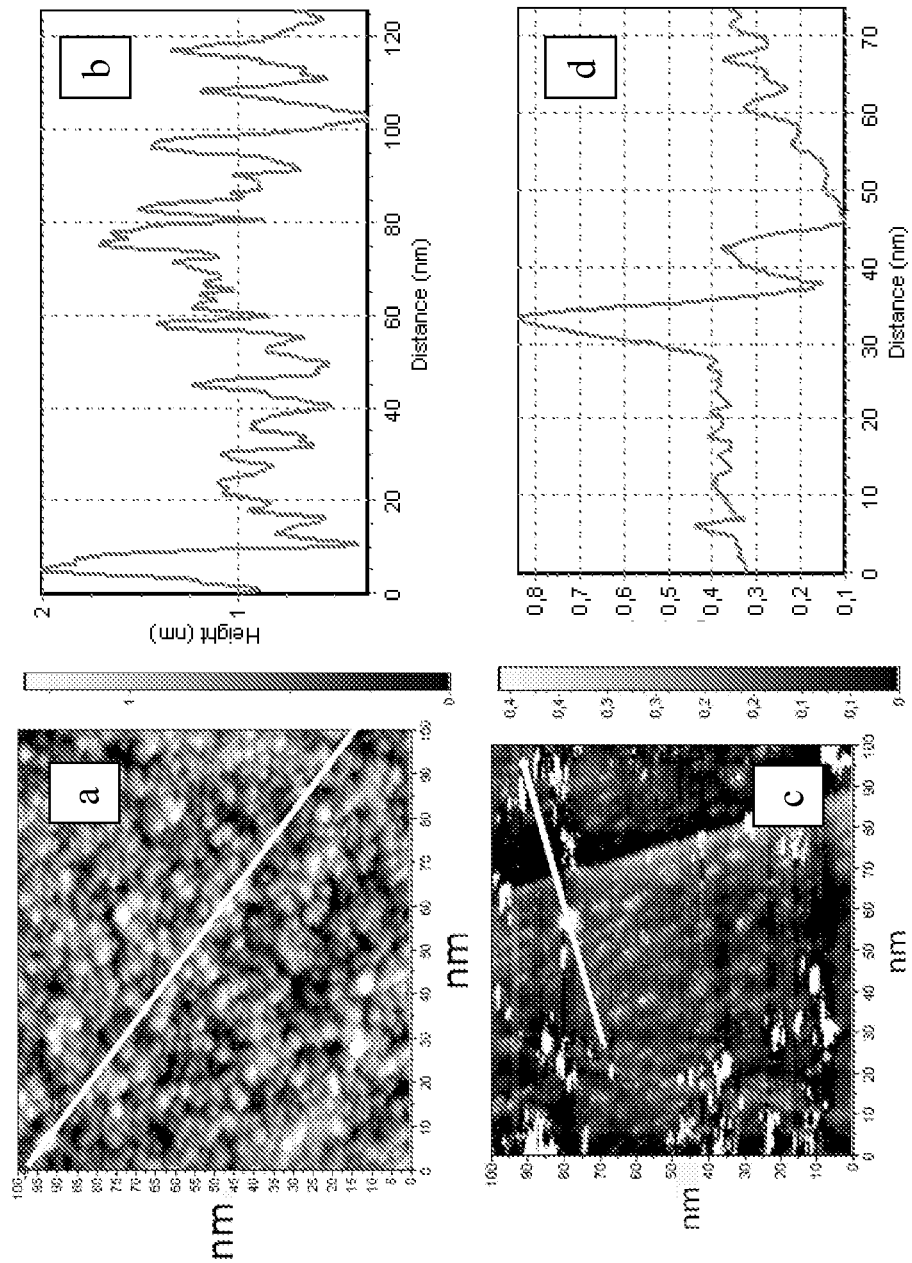

We will organize this Detailed Description into the following sections, which describe non-limiting examples of the invention:

Section 1. Manufacturing sub-critical clusters
Section 2. Research results on the structure of sub-critical clusters
Section 3. Research results on the properties of Materials comprising sub-critical clusters
Section 4. Summary of some features of sub-critical clusters and the materials they can form
Section 5: Key Features: a consolidated review
Section 6: Applications Section 1. Manufacturing Sub-Critical Clusters As noted earlier, in general, during the initial stage of vapour condensation, clusters of atoms, each with a sub-critical size nucleus, appear in the hot and high-density vapor cloud but are highly unstable. They appear and disappear quickly, due to the atoms exchanged with the vapor phase. Our analysis of the vapor condensation literature suggested that it was assumed that the expansion and cooling of the gas vapor leads, after termination of the initial stage, to the complete destruction of all subcritical nuclei or clusters.

Accordingly, it has previously been assumed that the growth of stable clusters, i.e. clusters of atoms, required an over-critical nucleus size (e.g. greater than 1 nm for carbon) and so only these over-critical size clusters were analysed. The creation of relatively large clusters, usually about several nanometer in size, is hence well understood. Conversely, nuclei with a sub-critical size were assumed to be so unstable as to be incapable of being produced commercially in any manufacturing process and have hence been largely over-looked.

However, our analytical studies show that there is a special regime of vapor condensation, in which the process of growth and destruction can result in the preservation of stable, subcritical nuclei at some moment during the vapor expansion. This results in the formation of rather small, stable, sub-critical size (e.g. for carbon, sub-nano) size clusters. This occurs due to a sharp increase in the characteristic time of the growth and destruction processes.

The special regime requires a particular mode of heating, ionization, and subsequent fast expansion and cooling of a vapor cloud. In this special regime, vapor condensation takes place, which leads to the formation of clusters of atoms that are each a solidified nucleus of sub-critical size—e.g. sub-nano size clusters of carbon atoms. We will refer to these groups of atoms as "clusters" or "sub-nano-clusters". For a carbon target, that means that the size (e.g. one dimension, such as the width or diameter, where a cluster is generally spherical) of the clusters formed in this special process is below 1 nm, since the 'critical size' for carbon is 1 nm.

Our analysis shows that the possibility of implementing this special condensation regime is determined primarily by the parameters of the evaporated material, as well as by the parameters of the ionized vaporised cloud, i.e. plasma, at the very initial moment of its expansion.

The initial plasma parameters are the initial radius of its volume $R_0$, the temperature $T_0$, and the total number of atoms in the plasma volume N. The material parameters are: σ which is scattering cross-section at the atom collisions and $T_s$ which is the temperature of material solidification.

The necessary relation between these parameters stems from the requirement of the realization of the collisional mode of vapor cloud expansion (collisional mode means that the mean distance between sequential atom collisions is shorter compared to the characteristic length of the vapor density variation):

$$R_0 \leq \sqrt{\sigma N / 80\pi} \text{ and}$$
$$T_0 \approx \sqrt{12}\, T_s.$$

Note that the realization of the collisional mode, at least in some part of the vapor cloud volume, guarantees the presence of a collision-free area at the outer part of the volume where the cloud density drops down. An important result of our analysis is that the clusters of subcritical size are formed just at the interface between the collisional and the collision-free areas of the expanding vapor cloud.

In the case of carbon, in one specific example, the material parameter values are: $\sigma = 2 \cdot 10^{-16}$ cm$^2$, and $T_s \approx 3600$K. With this, the first relation is fulfilled, e.g. at $N = 10^{16}$ cm$^{-3}$ and $R_0 = 1$ mm. These conditions can be realized under carbon vaporization by a pulsed laser. The second relation gives the required initial plasma temperature $T_0 \approx 12500$ K. This condition can be realized under carbon vaporization by a pulsed laser as well. The rapid expansion and rapid cooling of the vapor cloud takes place over between 2 to 4 micro seconds. The skilled implementer will appreciate that many different values of parameters can be chosen to satisfy the two relations.

Note that, depending on the conditions of vapor expansion and cooling, the cluster can transfer from the sub-critical state to the over-critical state due to an increase in its size but, as is outlined above, this transition may also happen without any change in cluster size. The reason is that the critical size itself is not constant and in some cases, e.g. under a fast decrease of vapor temperature, the critical size can quickly diminish, so that the cluster size will eventually turn to be larger than the critical one. This is the second scenario of the transition to the over-critical state. Therefore, we can say that the cluster properties that are size dependent can change in the course of transition, if this transition is accompanied by the size variation. The vapor should initially be supersaturated in order to initiate the nucleation process.

Note that although the manufacturing process described above produces stable clusters with a sub-critical size, and it is these sub-critical clusters that are especially interesting, this process may also at the same time produce stable clusters that are over-critical in size; so a carbon material may include clusters that are less than 1 nm in size, but also some clusters that are over 1 nm in size. So as not to exclude from the scope of this invention materials with some proportion of over-critical clusters, we generalise further to cover 'nano-cluster materials', defined as a material made of clusters that may be wholly sub-critical in size, or partly sub-critical and partly over-critical in size, or wholly over-critical in size.

Section 2: Research Results on the Structure of Sub-Critical Clusters

Using a laser evaporation process of a carbon target, and the parameters described above, we have produced samples of carbon sub-nano clusters. We describe the results of our analysis of these samples in this section. We then go on to describe the structure of these carbon sub-nano clusters.

FIG. 1.1 shows STM images of the carbon material. The images were taken using laboratory modified GPI-300 tunnel microscope setup. Measurements were performed at the probe voltage $U_t$=600 mV and probe current $I_t$=10 pA. The tungsten probe was used that was first electrochemically sharpened and then cleaned by $Ar^+$ milling for 4 hours. During the measurements the vacuum in the chamber was $2.4 \times 10^{-7}$ Pa.

FIG. 1.1a shows a STM image of a carbon material deposited as a thin film on a substrate of Highly Ordered Pyrolytic Graphite (HOPG). The figure shows that the material consists of randomly positioned sphere-like clusters.

FIG. 1.1b shows a surface profile taken by STM along the green line shown in FIG. 1a. As seen, the dominant height of the film relief is less than 1 nm.

FIG. 1.1c shows a STM image of a single carbon cluster of the carbon material positioned on smooth surface of HOPG.

FIG. 1.1d shows a surface profile taken by STM along the green line shown in FIG. 1c. The height of the cluster is about 0.4 nm, while the registered in-plain size of the cluster is not the real size but is determined by probe shape near its end.

Figure 2:
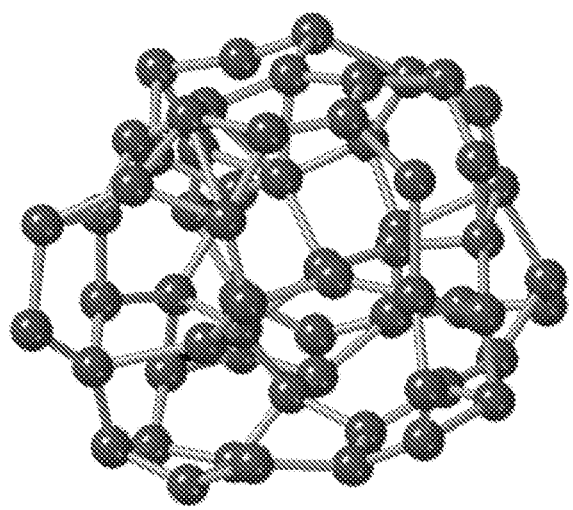
FIG. 2 is an image of carbon cluster constituting 64 carbon atoms simulated by molecular dynamics. The cluster structure is disordered (amorphous).

FIG. 2 is an image of an amorphous carbon cluster simulated by a molecular dynamics method, density-functional calculations, carried out using the CASTEP and VASP codes. Ultrasoft pseudopotentials were used in the simulation. The exchange term was evaluated using the generalized gradient approximation (GGA) and the PBE functional. Grimme's DFT-D2 method was used to account for dispersion interactions. The cluster consists of 64 carbon atoms. In spite of the pentagon and hexagon atomic configurations that are present at the cluster surface, some carbon atoms are positioned inside the cluster and the cluster structure is disordered (amorphous). This is just one possible example of a cluster; clusters may have different numbers of atoms.

Figure 3:
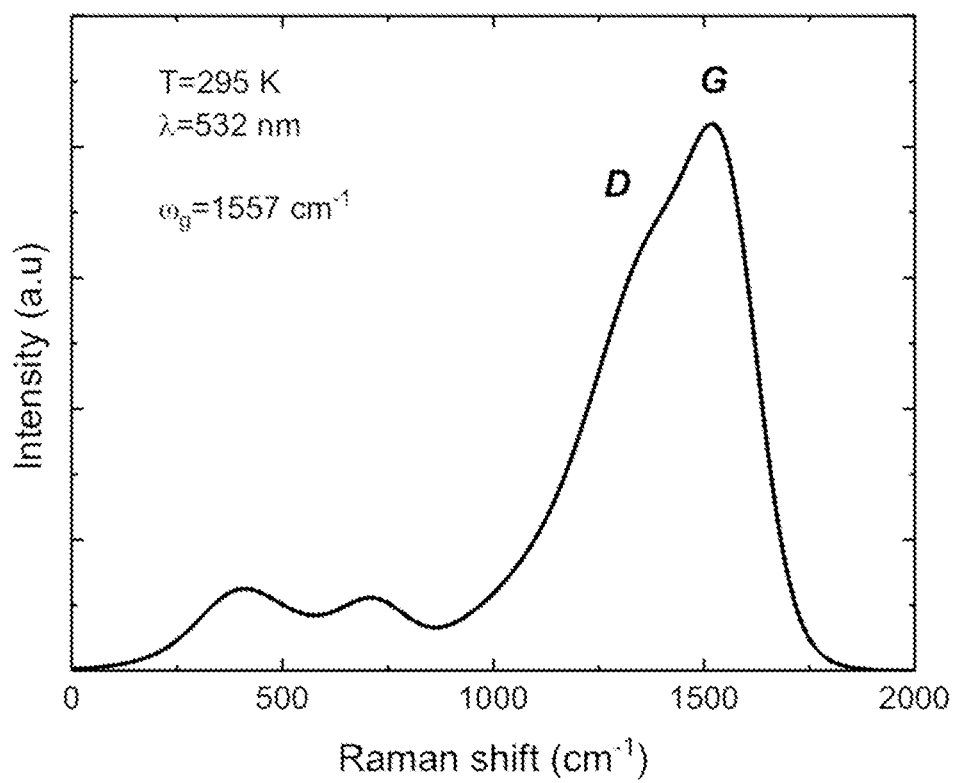
FIG. 3 is a Raman spectrum taken of the carbon material. The spectrum shape corresponds to amorphous carbon material.

FIG. 3 represents typical Raman spectrum of the carbon material. Raman measurements were performed at room temperature in the backscattering configuration using a T-64000 spectrometer installation (produced by Horiba-Jobin Yvon, France). The spectrometer is equipped with a silicon CCD array cooled with liquid nitrogen, a 600 lines/mm grating, and a confocal microscope, which could provide information from a part of the carbon film ~1 μm in diameter. Together with performing local diagnostics, we analyzed large sample areas (from 10×10 to 500× 500 μm), with the subsequent plotting of Raman maps of the spectral line parameters. This procedure made it possible to carry out one of the main tasks of the present study, which consisted in assessing the uniformity of the structural characteristics over the sample area. We used an excitation light wavelength of 532 nm of a Nd:YAG-laser (Torus, Laser Quantum, Inc.) in the measurements. A laser power on a sample was about 200 mkW in a spot ~1 μm in diameter, obtained with a 100× objective lens (NA=0.9). A spectrometer resolution consisted of 2.5 $cm^{-1}$.

The shape of the spectrum presented in FIG. 3 corresponds to an amorphous carbon material.

Whilst these results relate to carbon, other elements, such as silicon or aluminium, may also be used.

In the preceding section, we looked at the properties of an individual cluster and properties of a material made up of these clusters. We will now look at some further research results from testing the materials that we have made.

Figure 4:
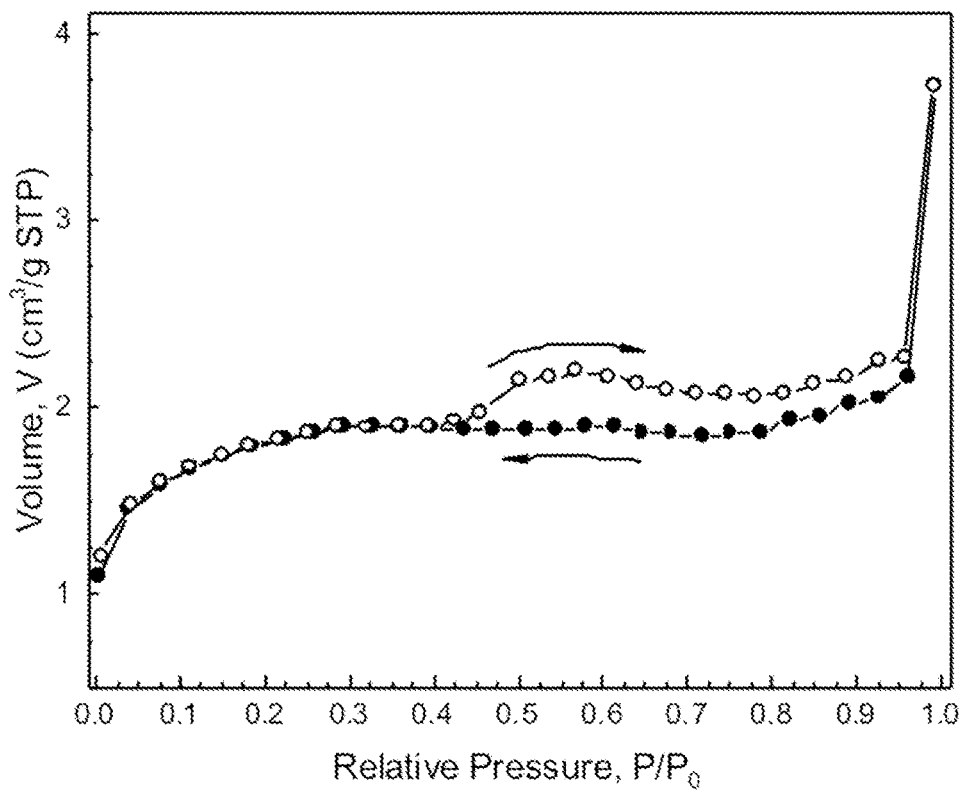
FIG. 4 is an isotherm of nitrogen adsorption-desorption in carbon material.

Section 3. Research Results on the Properties of Materials Comprising Sub-Critical Clusters FIG. 4 shows an isotherm of nitrogen adsorption-desorption in the carbon sub-nano cluster material produced using the method described above. BET was taken using QuantaChrome Nova 1200e setup. Sample was degassed for 15.5 hours in vacuum at the pressure of $10^{-5}$ Torr at 150° C. before measurement. The specific surface area of the sample (S) was determined by the Brunauer-Emmett-Teller and the Langmuir models from 7 points in the range of nitrogen partial pressure $P/P_0$=0.07÷0.25. The size distribution of pores was calculated by analyzing the total adsorption-desorption isotherms in the range of nitrogen partial pressure of 0.01÷0.99 using the density functional method by equilibrium model of the nonlocal density functional for slit-like pores.

Figure 5:
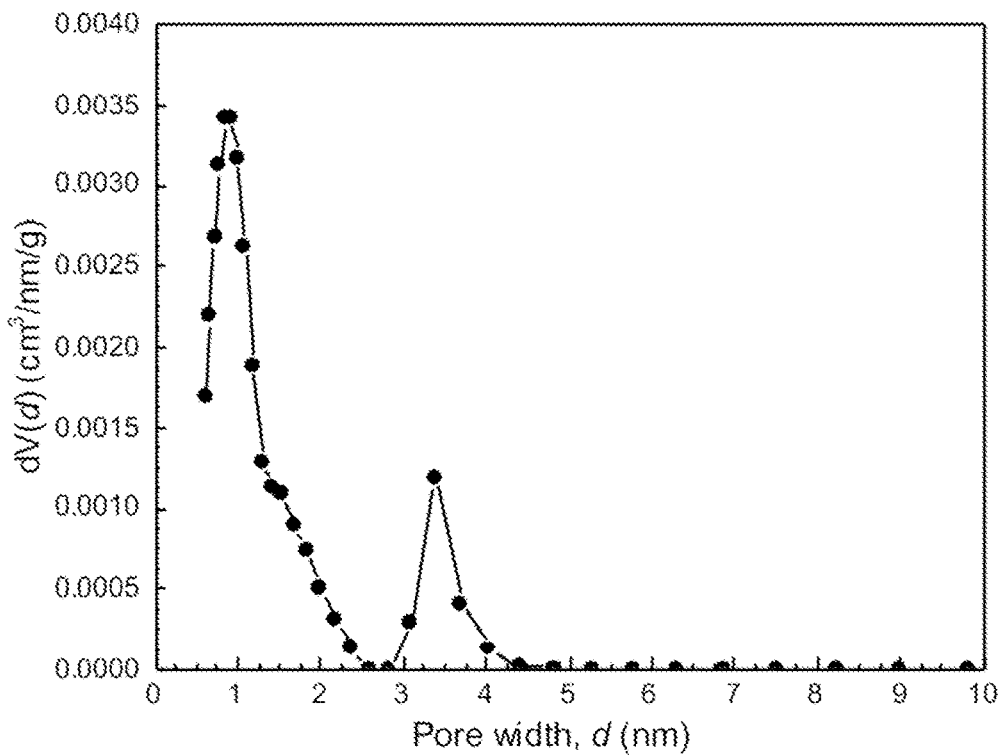
FIG. 5 shows the size distribution of pores calculated by using the density functional method by equilibrium model of the nonlocal density functional for slit-like pores. The size distribution of pores is bimodal with the dominant pore sizes 0.85 nm and 3.5 nm.

FIG. 5 represents the obtained size distribution of pores in the carbon sub-nano cluster material demonstrating the bimodal size distribution with the dominant pore sizes 0.85 nm and 3.5 nm.

Figure 6:
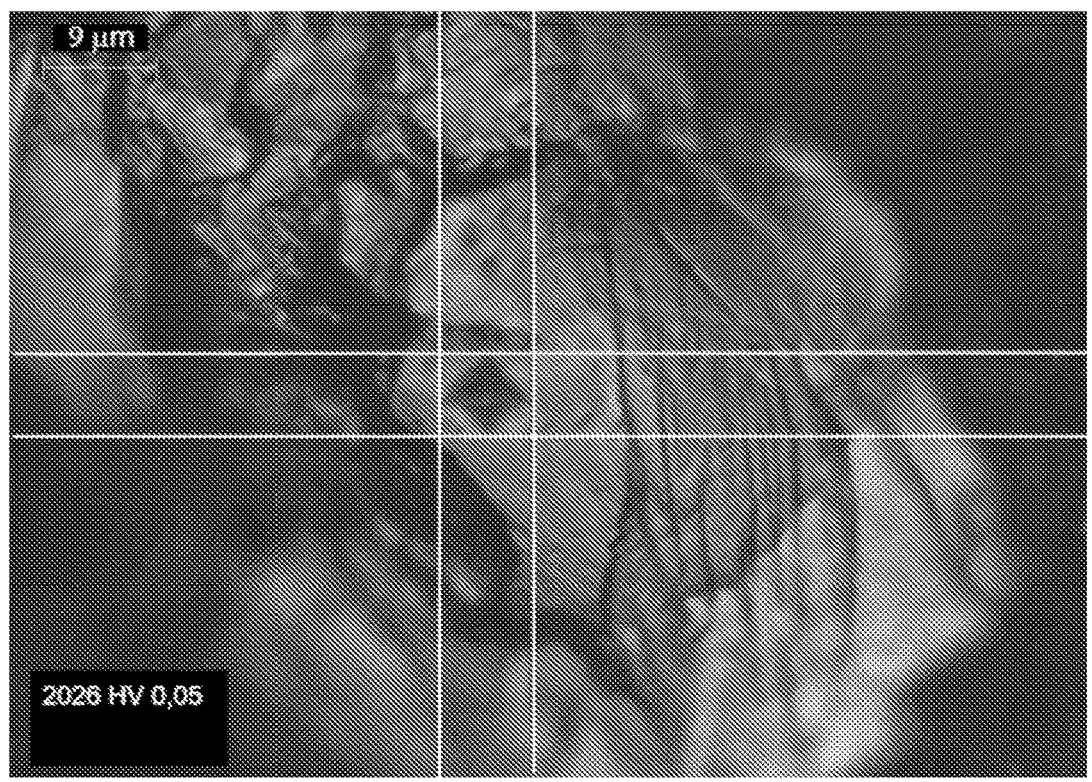
FIG. 6 shows an image of the imprint of a microindenter, demonstrating high carbon material hardness.

FIG. 6 shows the imprint of a microindenter in the surface of the carbon material. The carbon material is formed by closely packed nano-clusters and has a fractal structure. That is, at the first stage, clusters form agglomerates of small size (say 5 nm), then these agglomerates form agglomerates of the following order, etc. It is clear that the higher the orders of agglomeration have lower bond strength between them. Thus, the mechanical properties of the material are highly dependent on spatial scale. In particular, hardness depends on the size of the indenter size used. Measurements at the atomic level using a diamond probe of an atomic force microscope give values above 50 GPa (diamond 70-100 GPa), which is the upper limit for the method. However, this method is not a standard. Microhardness measurement, a standard technique, indicates that the characteristic size of the imprint, that is, the spatial scale, is in units of microns.

FIG. 6 shows a photograph of an imprint made on a DuraScan G50 device, certified for these tests, at a load of 0.05 kgf. The hardness value determined from this imprint is 20 GPa. This value corresponds to corundum (9 Mohs) and surpasses all known carbon materials, except diamond.

It is worth noting that the hardness of the carbon material depends on the process conditions. The residual pressure in the chamber, the temperature and the type of substrate, as well as doping are important. With a certain set of parameters, hardness can be reduced to 0.1 GPa, which corresponds to very soft materials.

Figure 7:
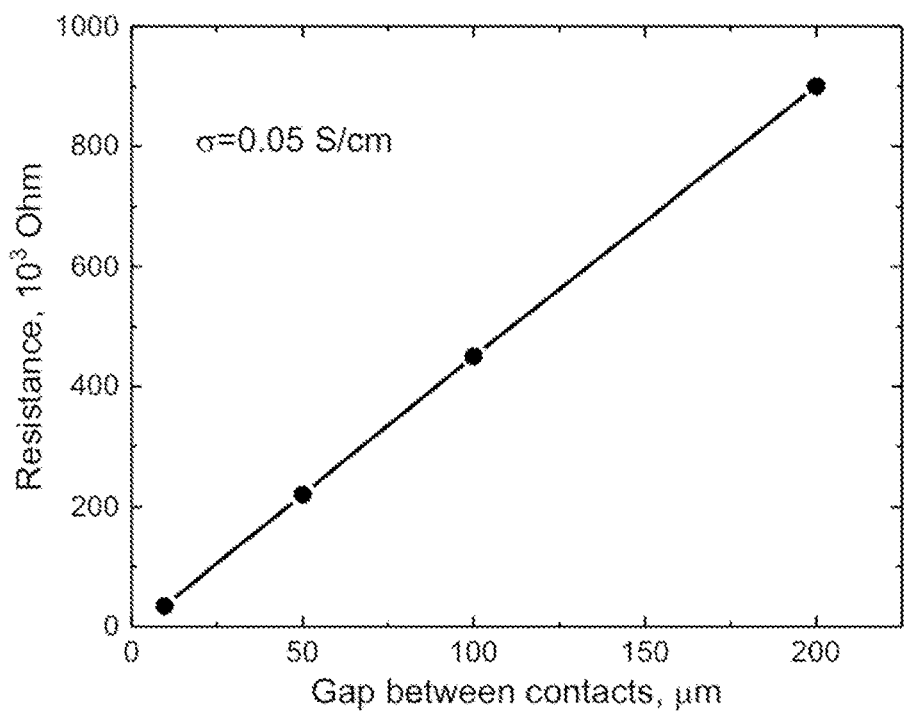
FIG. 7 shows the carbon material film lateral resistance measured as function of the gap between planar contacts. The slope of the fitting line gives a material conductivity value of 0.05 S/cm.

FIG. 7 provides the electrical resistance of the carbon sub-nano cluster material measured in thin film by four-contact method at 20° C. To measure the resistance test samples were fabricated by deposition of thin (about 1 μm thick) carbon material film on an insulating substrate which was an oxidized silicon wafer. Then, by using standard photolithography method a series of planar metallic (Cr/Au) contacts were formed on the film surface with variable gap between the contacts. FIG. 7 shows the measured resistance as function of the gap between two adjacent planar contacts. The slope of the fitting line gives a material conductivity value 0.05 S/cm.

Figure 8:
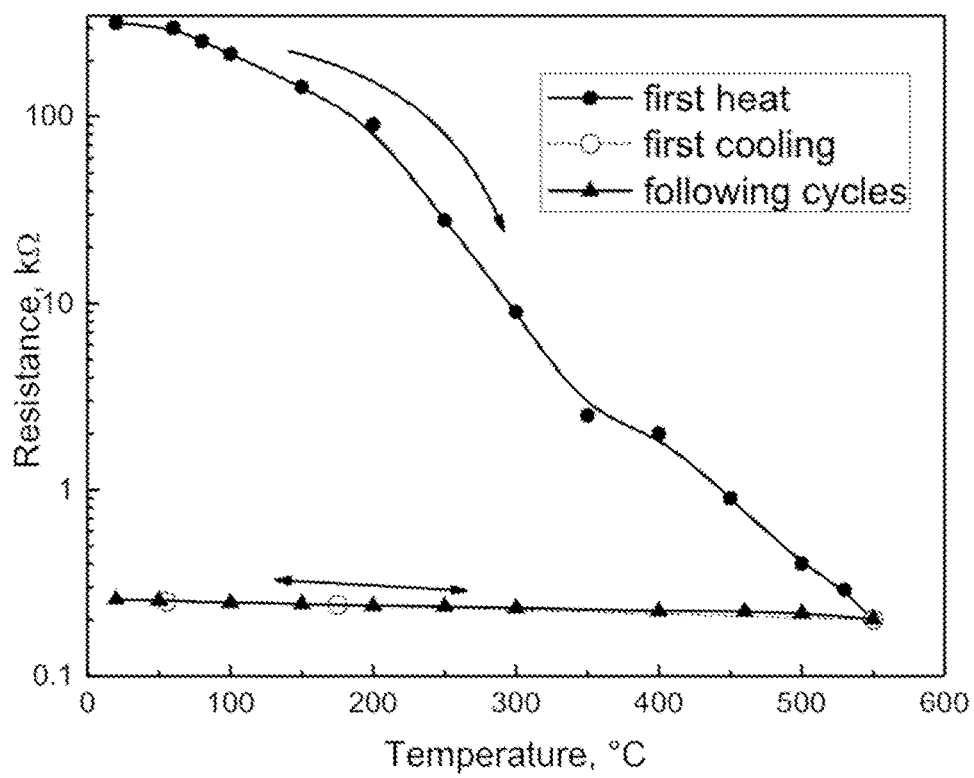
FIG. 8 shows the behavior of carbon material electric resistance under the carbon material annealing at the temperatures up to 550° C.

FIG. 8 shows the behavior of the carbon sub-nano cluster material electric resistance under the material annealing. As seen in this figure, the material resistance decreases (conductivity increases) irreversibly for three orders of magnitude under the material annealing at 550° C.

Figure 9:
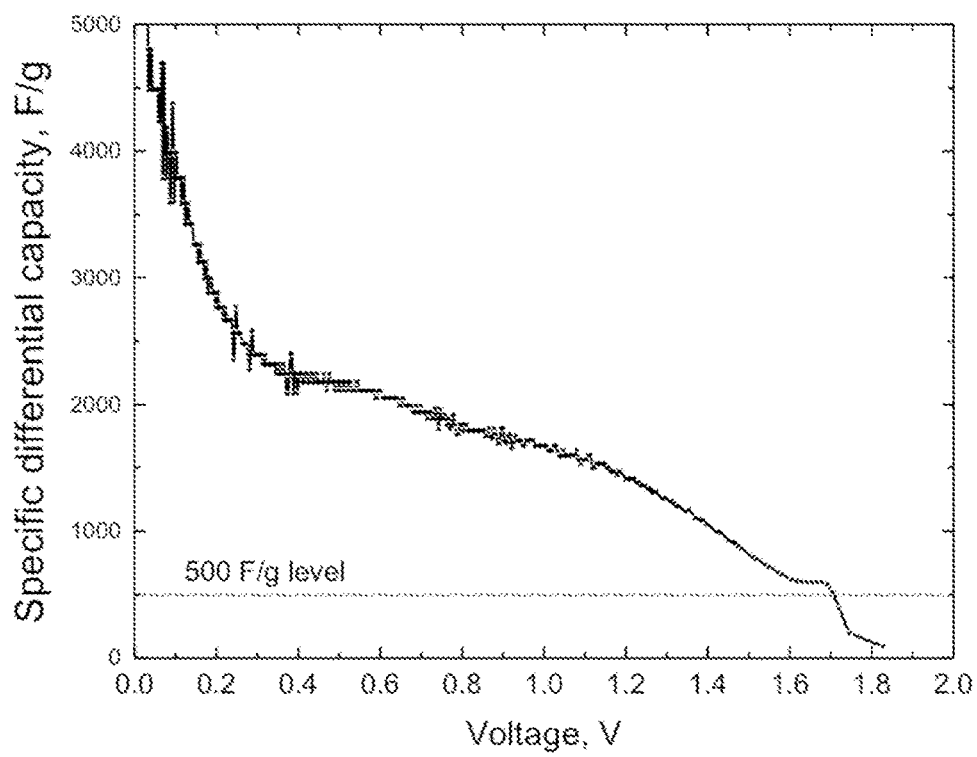
FIG. 9 shows a specific differential capacity of the carbon material under lithium accumulation as function of the carbon material potential vs L/L$^+$.
Figure 10:
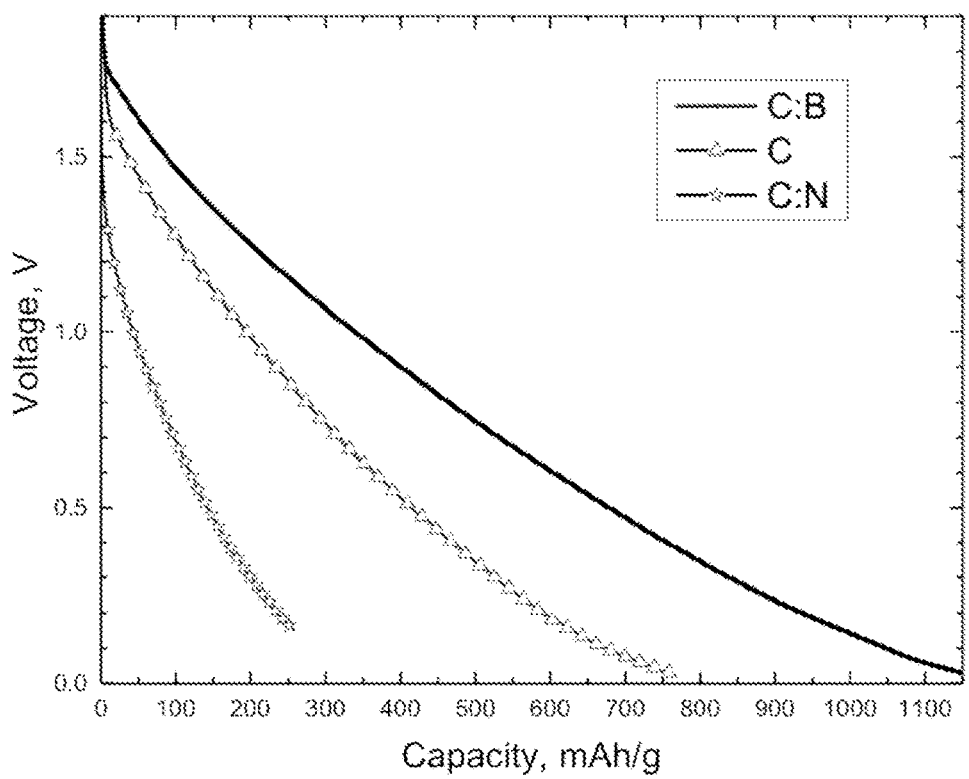
FIG. 10 represents discharge curves of the carbon material registered under accumulation of Li$^+$ ions. Curves are taken for pure, nitrogen doped, and boron doped carbon materials.
Figure 11:
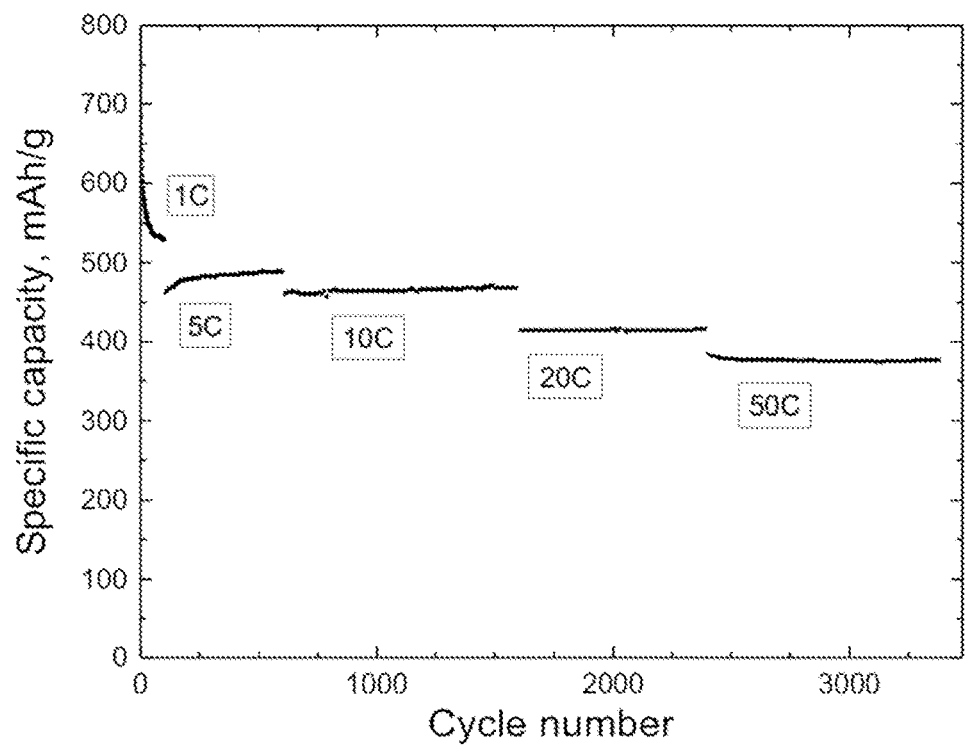
FIG. 11 shows the specific Li-ion storage capacity of the carbon material measured at C-rates ranging from 1 C up to 50 C.

FIGS. 9, 10, and 11 represent significant data on the capacity of the carbon material (specific differential capacity vs voltage, the dependence of discharge capacity on material doping, and specific capacity vs cycle number, respectively). The capacity of the carbon material has been measured in a lithium-based energy storage device, i.e. in a cell, comprising, in succession, a thin, i.e. 100 nm thick, carbon material film deposited on a copper foil, a separator (i.e. Celgard 2325 which is 25 μm thick), and a lithium foil (i.e. 100 μm thick). The separator was permeated with 1M $LiPF_6$/EC-DMC electrolyte (i.e. supplied by Tinci, China). The cell was assembled in standard CR2032 cage. Assembling was performed in Ar atmosphere, in glowbox (i.e. OMNI-Lab, Vacuum Atmospheres Ltd., US). Capacitance measurements and cells cycling experiments were performed in galvanostatic regime by using standard equipment (i.e. Potentiostat-Galvanostat P45X, Elins Ltd.) with the accuracy of current setting 0.2 nA and voltage measurement 40 μV.

FIG. 9 shows that the specific differential capacity of the carbon material under lithium accumulation is significantly high, especially at the voltage over 1 V, which distinguishes our carbon material from e.g. graphite, hard carbon, and different activated carbon materials.

FIG. 10 represents discharge curves of the pure carbon material, nitrogen doped material, and boron doped material. This figure demonstrates that, compared with pure carbon material, nitrogen doping results in decrease of material capacity together with diminishing the voltage operation window. On the other hand, doping with boron provides significant increase of capacity, while the voltage operation window becomes broader. Thus, the possibility to control the capacity and voltage operation window by material doping is demonstrated.

FIG. 11 demonstrates that specific Li-ion storage capacity of our carbon material is much higher compared to other carbon materials, while the drop of the carbon material capacity is moderate in the range of C-rate variation from 1 C up to 50 C. This slow decrease of capacity under the increase of C-rate is directly related to the specific feature of the material, that is the high ionic (Li-ion) conductivity.

Figure 12:
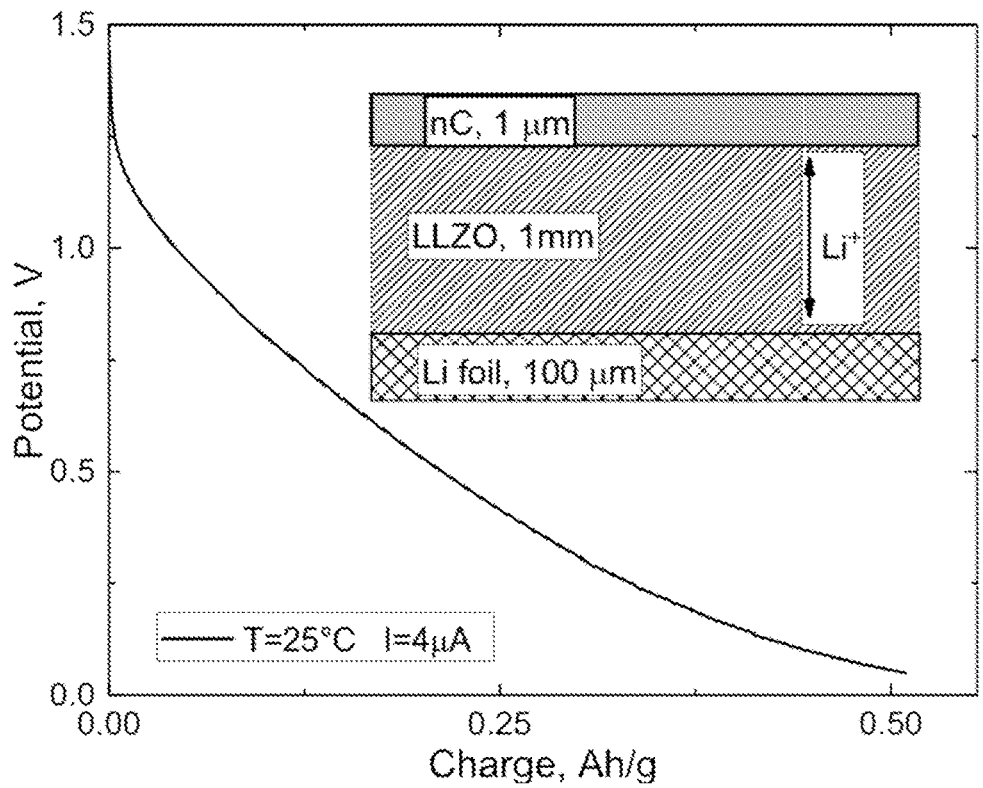
FIG. 12 shows a discharge curve of the all-solid battery devices based on the carbon material (nC).

FIG. 12 shows an example of all solid-state energy storage device. The device operation is based on the high mobility of the Li-ions in the nC material that allows us to create an electrode (cathode in the example) consisting of only the nC. To create the device, the 1 μm nC layer was deposited on the solid state electrolyte (SSE) by laser evaporation. SSE was a piece of the $Li_7La_3Zr_2O_{12}$ (LLZO) 1 $cm^2$ in area and 1 mm thick. On the opposite side of the SSE, the Li foil was attached mechanically (see inset). The battery unit was placed into a CR2032 coin cell. The charge and discharge curves at galvanostatic mode were measured for the device. Shown in FIG. 12 is the discharge curve taken for cycle 85. The test was performed at room temperature and at a current of 4 μA. The device shows more than 0.5 Ah/g of specific charge capacitance. In this example, the solid electrolyte is just a separator between the anode and cathode that blocks the electronic current and provides an ionic one. At the same time, the carbon electrode made of nC is electrolyte free.

Figure 13:
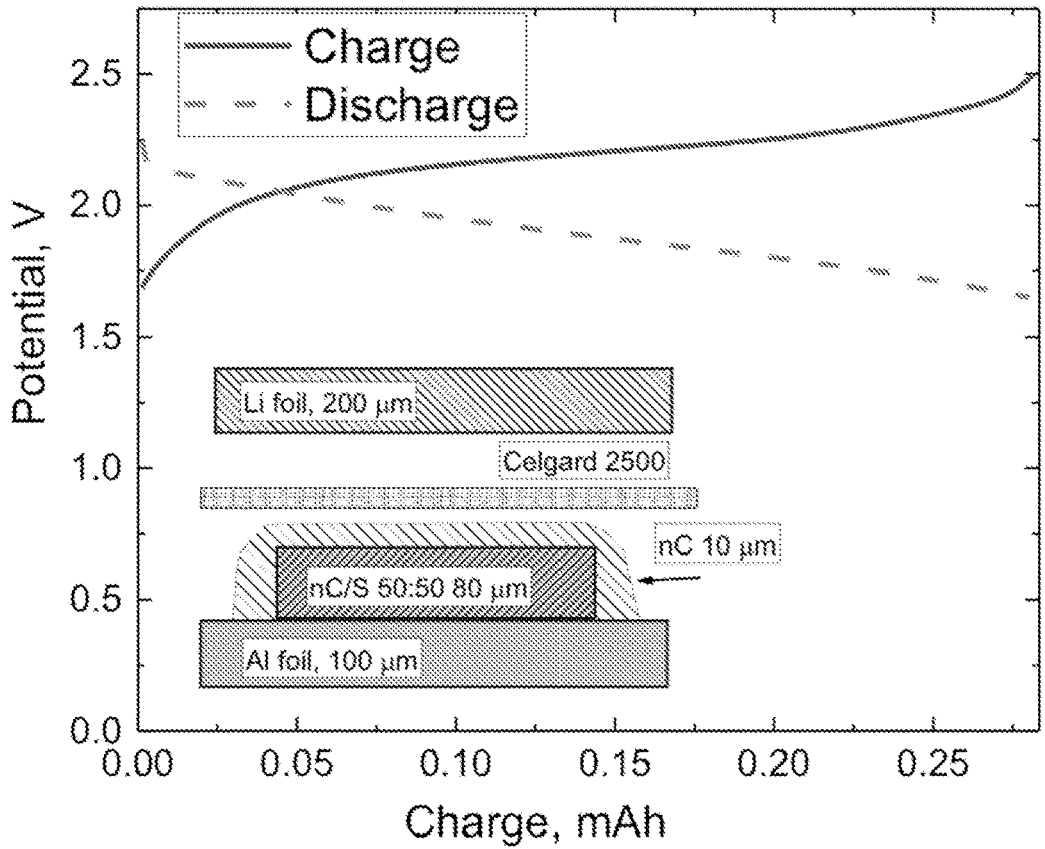
FIG. 13 shows charge-discharge curves of the Li$_2$S battery device using the carbon material (nC).

FIG. 13 represents a lithium-sulfur battery with a solid state cathode. It is known that lithium-sulfur batteries demonstrate higher specific energy densities compared to commercially available lithium-ion batteries. However, their use is strongly limited due to a short life time. The latter originates from an adverse interaction between reactive polysulfide species, formed from elemental sulfur during the operation of a lithium-sulfur battery, and carbonate-containing liquid electrolyte commonly used in rechargeable batteries. Due to this adverse interaction, the cathode active material of a lithium-sulfur battery, the sulfur, disactivates during the operation of the battery, leading to a large fade in energy density of lithium-sulfur batteries. Using the unique properties of the nC material, the problem can be solved to a large extent.

In this example the nC is used to provide electronic and ionic conductivity in the sulfur cathode as well as to protect the cathode from adverse interaction of the sulfur and the liquid electrolyte. The latter is based on the fact that the laser deposited nC layer is nontransparent for liquids.

The scheme of the battery device is depicted in the insert to FIG. 13. It comprises the nC based cathode, Li foil anode, carbonate based liquid electrolyte (1M $LiPF_6$ in EC/DMC 1:1) and separator (Celgard 2500).

The cathode suggested comprises of two parts. An active part is a mixture (50:50 mass ratio) of the nC and sulfur which is deposited on the Al foil by a standard technique. Active area was 1.4 $cm^2$. The protective part is a layer of the nC deposited by laser evaporation above the active layer. The battery unit was assembled in a CR2032 coin cell.

The battery was tested in galvanostatic mode. Typical charge-discharge curves are presented in FIG. 13 for the cycle 115, the current was 0.25 mA (~1C). The device had been testing for 500 cycles and shown just 15% capacitance degradation. We should note that carbonates strongly interact with polysulfides, formed from sulfur during the operation of the battery. This side reaction normally makes it impossible to use carbonates in lithium-sulfur batteries. Since our device was cycling for more than 500 cycles it demonstrates that the protective layer is completely untransparent for the liquid electrolyte. At the same time since the device can be charged and discharged one can conclude that lithium ions can effectively penetrate the protective layer and diffuse into the active layer to a certain extent. Considering the device geometry, applied current, and voltage drop we can perform the lowest estimate for the ionic conductivity of the nC under given conditions which is $>10^{-4}$ S/cm.

According to the shape of the voltage profile (FIG. 13), we can also note that $2Li+S \leftrightarrow Li_2S$ reaction takes place in the solid state phase. Therefore, nC can be used as universal host for solid state batteries that provides mutual conductivity and allowing the reaction to take place in solid state.

The thermal and chemical stability of the carbon material is noteworthy. Experimental results are as follows.

1. Oxidation by Heating in Air:

The carbon material deposited on a substrate as a layer of thickness of 30-100 microns was separated from the substrate in the form of flakes with an area of 1-20 $mm^2$. These flakes were placed in a quartz bowl in an amount of 1.1 grams. Further, the material was heated to a temperature of 800° C. and held for 10 hours in the air. After cooling, the material was weighed, and its weight was 0.45 grams. Thus, the weight loss was 60%. Under similar conditions, a piece of carbon glass 1.6 mm thick, of the same mass, completely burned out after 5 hours.

2. Chemical Oxidation.

The carbon material was ground in a planetary mill to a powder form with a characteristic grain size of about 5 μm and a maximum size of not more than 20 μm. The material was placed in a saturated solution of chromium anhydride ($CrO_3$) in concentrated sulfuric acid (97% $H_2SO_4$). The mass of carbon material was 250 mg and the volume of the oxidizing agent was 100 ml. This provided a large excess of oxidizing agent. The mixture of oxidizing agent and carbon material was heated to 100° C. and kept under these conditions for 5 hours. Then the remaining material was separated from the solution on filters, washed and thoroughly dried. The residual mass of the carbon material was 140 mg.

Under similar conditions, all known carbons are completely oxidized to form $CO_2$ gas. Typical oxidation times range from a few minutes (soft-carbon, hard carbon, carbon nanotubes, SP, graphite) to tens of minutes (carbon glass only).

Section 4. Summary of Some Features of Sub-Critical Clusters and the Materials they can Form We will look now in more detail at some features of sub-critical size clusters and the materials they form. We will cover the following areas:
- 4A: Amorphous Structure of an individual sub-critical cluster
- 4B. High electrochemical capacity of the material formed from sub-critical clusters
- 4C. Deformed spherical shape of an individual sub-critical cluster
- 4D. Self-Assembly by sub-critical clusters
- 4E. Ions can readily pass into the sub-critical cluster material
- 4F. Configurable shape of the sub-critical cluster material
- 4G Depositing the material onto a substrate
- 4H. Thermal and chemical stability 4A. Amorphous Structure of an Individual Sub-Critical Cluster A sub-critical size cluster, e.g. a carbon sub-nano cluster, has a substantially amorphous, non-crystalline structure.

Note that by 'substantially' we mean nearly all. For example, with sp2-hybridised carbon there is always the possibility that there is a small (e.g. 100 atoms) fraction of clusters that have a crystalline structure. But a carbon sub-nano cluster is essentially free of internal crystalline structure or domains. Further, the material made up of many of these carbon sub-nano clusters is also substantially free of crystalline domains. Molecular dynamics indicates that a single carbon sub-nano cluster may have a 64 atom cluster that is non-crystalline in structure (see FIG. 2) but clusters may be formed from a different number of atoms; 64 is one non-limiting example.

The carbon sub-nano cluster is typically less than 1 nm in size, and in one important implementation is approximately within the range of 0.3 nm/0.4 nm-0.7 nm in size. Each of these carbon clusters are substantially amorphous in structure, in the sense that their atomic structure is irregular, which is typical for carbon clusters smaller than C60 fullerenes [R. O. Jones, Journal of Chemical Physics, 1999, 110(11), 5189-5200] (the size of C60 is ~0.75 nm [A. Goel et. al., Carbon 42 (2004) 1907-1915]).

Within the carbon sub-nano cluster material, carbon sub-nano clusters are closely and randomly packed together. Carbon sub-nano cluster material, consisting of amorphous carbon sub-nano clusters, is essentially amorphous. The amorphous structure of carbon sub-nano cluster material is confirmed by Raman spectra taken on this material (see FIG. 3). Note however that a material produced by the process described above may include not only amorphous carbon sub-nano clusters, but also crystalline clusters that may be of over-critical size.

4B. High Electrochemical Capacity of the Material Formed from Sub-Critical Clusters Compared to, for example, hard carbon and activated carbon materials, the carbon sub-nano cluster material has a very moderate specific surface area of about 6-8 $m^2/g$, and preferably 7 $m^2/g$ (measured with $N_2$ physisorption). However, the carbon sub-nano cluster material has high ionic conductivity, (for example, $10^{-4}$ S/cm, measured with respect to Li ions). This high ionic conductivity contributes to very high levels and very high speed of ion (Li-ion) accumulation in the carbon nano-cluster material. We use the term "accumulation" to differentiate over "adsorption" and "intercalation"; "adsorption" and "intercalation" are not significantly relevant to this material.

The sub-critical cluster material, e.g. carbon sub-nano cluster material, has many advantages over crystalline carbon materials like graphite. The sub-critical cluster material has more ways of storing charged ions. Graphite (which is ~99% crystalline) can only store metal ions between graphene layers through an ion intercalation process, and this ion intercalation process is relatively slow. Conversely, amorphous sub-critical cluster material, e.g. carbon sub-nano cluster material, can accumulate metal ions in the material volume, e.g. on the surface of the carbon sub-nano clusters, and the ion accumulation proceeds with high speed (leading to the possibility to operate with a high C-rate, as shown in FIG. 11). Amorphous carbon sub-nano cluster material can in conclusion accumulate more metal ions and ion accumulation can proceed with a higher rate, which makes a sub-critical cluster material, e.g. a carbon sub-nano cluster material, especially useful in a supercapacitor implementation. FIGS. 9 and 11 illustrate the high electro-chemical capacity of this material.

4C. Deformed Spherical Shape of an Individual Sub-Critical Cluster

A sub-critical cluster, e.g. a carbon sub-nano cluster, may have a substantially spherical or a deformed spherical shape and may be between 0.3/0.4 nm and 0.7 nm in diameter. Molecular dynamics indicates that a single carbon sub-nano cluster may, as an example, be a 64 atom cluster that is a deformed spherical or deformed shell shape (see FIG. 2). The shape of such a small cluster is of course difficult to establish, not least because STM measurements indicate a spherical or deformed spherical shape as an artefact of the measurement process; nevertheless, we expect that the shape of the sub-critical cluster is not highly elongate but instead more like a deformed or crumpled shell, like a deformed sphere.

4D. Self-Assembly by Sub-Critical Clusters

A sub-critical size cluster, e.g. a carbon sub-nano cluster, can self-assemble with other similar clusters to form a material. The manner of self-assembly may be consistent and repeatable across large numbers of clusters.

The self-assembled formation of the material is good for reproducibility issues. Otherwise, when manufacturing these sub-nano materials, it would be very difficult to control the cluster assembly into a material, in order to get the same material and properties every time.

4E. Ions can Readily Pass into the Sub-Critical Cluster Material

The sub-critical clusters, e.g. carbon sub-nano clusters, self-assemble into a material that has high ionic conductivity, most likely attributable to the very small size of the clusters in the material that enable ions to readily pass into the material.

4F. Configurable Shape of the Sub-Critical Cluster Material

The material made up of sub-critical clusters, e.g. carbon sub-nano clusters, may be formed into a desired shape or configuration, such as a thin layer or coating or grains of powder.

4G. Depositing the Material onto a Substrate

The material made up of sub-critical clusters, e.g. carbon sub-nano clusters, can be formed or deposited on a substrate such as carbon paper, conducting (e.g. carbon and metal) wires, metal foam, and oxides. The material can be deposited as a layer onto the substrate, with the layer thickness being in the range from approximately 10 nm to 500 µm, and in some cases can be separated from the substrate, and separated material can be further milled to get material powder. This material can be used in a supercapacitor electrode. We will give a more detailed example in Section 6D.5 below, where we describe how the material can be formed onto a conductive wire substrate.

4H. Thermal and Chemical Stability

The material made up of sub-critical clusters, e.g. carbon sub-nano clusters, demonstrates outstanding thermal and chemical stability. These features contribute to long cycle life of energy storage devices as demonstrated in FIG. 11.

Section 5: Key Features: A Consolidated Review

In this section, we bring together in one place a consolidated summary of all of the key features. The organisation is as follows:

5A. Manufacturing Sub-Critical Clusters
5B. Summary of features of Sub-Critical Size clusters
5C. Summary of features of Carbon Sub-Nano Clusters
5D. Summary of features of materials comprising multiple Sub-Critical Size clusters
5E. Summary of features of materials comprising multiple carbon Sub-Nano clusters
5F. Summary of Special Properties of Material Comprising multiple Carbon Sub-Nano Clusters
5G. Extending these Feature Sets to Nano-Clusters Note that each Feature Sets can be combined with any other Feature Set; optional features can be combined with any Feature Set.

5A. Manufacturing Sub-Critical Clusters

We can generalise the manufacturing process in the following Feature Set 1:

Feature Set 1: Manufacturing Sub-Critical Clusters

A method of making stable clusters of atoms that are of subcritical size, in which rapid expansion and rapid cooling of a vapor cloud takes place in which the vapor conditions or parameters are controlled so that multiple stable clusters, each with a size less than the critical size, or that are formed in a sub-critical nucleation process, are condensed.

A method of making stable clusters of atoms, in which rapid expansion and rapid cooling of a vapor cloud takes place in which the vapor conditions or parameters are controlled so that multiple stable clusters, each formed in a sub-critical nucleation process that would otherwise lead to their destruction, are instead condensed into the stable clusters.

A method of making stable clusters of atoms that are of subcritical size, in which vapour cloud expansion is controlled so that it enters a regime in which the destruction of clusters with a subcritical size, or that are formed in a sub-critical nucleation process, is substantially ended or curtailed.

A method of making stable clusters of atoms that are of subcritical size or are formed in a sub-critical nucleation process, by directly or indirectly controlling one or more parameters that are a function of the material and the conditions of the vaporization and condensation.

A method of making stable sub-critical clusters using laser evaporation in which rapid expansion and rapid cooling of a vapor cloud takes place in which the vapor conditions are controlled so that multiple stable clusters, each with a size less than the critical size or that are formed in a sub-critical nucleation process, are condensed.

In each case above, where the cluster is made of carbon, then the size of the cluster is less than 1 nm, for example between 0.3/0.4 nm and 0.7 nm.

We can also define the method of creating sub-critical clusters in more detail, as follows.

A method of making stable sub-critical clusters of atoms, in which rapid expansion and rapid cooling of a vapor cloud takes place and the vapor creation conditions at the moment of initial vapour expansion are set or controlled so that stable clusters of the atoms, each with a size less than the critical size, or that are formed in a sub-critical nucleation process, are condensed.

A method of making stable, sub-critical clusters of atoms, in which rapid expansion and rapid cooling of a vapor cloud takes place and the vapor creation conditions at the moment of initial vapour expansion are set or controlled to provide that the vapor expansion (i) does not occur so fast that clusters of any size have insufficient time to form and (ii) does not occur so slowly that any subcritical sized clusters disappear through atomic exchange with vapour phase.

A method of making stable, sub-critical clusters of atoms, in which rapid expansion and rapid cooling of a vapor cloud takes place and the vapor creation conditions are set or controlled to provide that the vapor cloud expansion is in collisional mode, where collisional mode means that the mean distance between sequential atom collisions is shorter compared to the characteristic length of the vapor density variation):

$$R_0 \leq \sqrt{\sigma N/80\pi} \text{ and}$$

$$T_0 \approx \sqrt{12}\, T_s.$$

the initial plasma parameters are the initial radius of its volume $R_0$, the temperature $T_0$, and the total number of atoms in the plasma volume N. The material parameters are: $\sigma$ which is scattering cross-section at the atom collisions and $T_s$ which is the temperature of material solidification.

clusters of subcritical size form at the interface between those volumes of the expanding vapour cloud which are in collisional mode, and regions outside of these collisional mode volumes which are not in (or at least not substantially in) a collisional mode.

When the expanding vapor cloud volume is in collisional mode, then that leads to the presence of a collision-free (i.e. substantially collisional-mode free) zone at the outer part of the expanding vapor cloud volume where the cloud density drops down, and clusters of subcritical size form at the interface or boundary between the collisional mode volume and the collision-free zone or zones of the expanding vapor cloud.

for carbon, the material parameter values are, in one non-limiting example, substantially equivalent to: $\sigma=2\cdot10^{-16}$ cm$^2$, and $T_s \approx 3600$K. With this, the first relation is fulfilled, e.g. at N=$10^{16}$ cm$^{-3}$ and $R_0$=1 mm. The second relation gives the required initial plasma temperature $T_0 \approx 12500$ K.

Manufacturing of the sub-critical clusters is possible using established techniques:

A pulsed laser evaporation process of a carbon target is configured to meet or deliver the conditions or parameters defined above.

An industrially scalable process in which a high density plasma of ions of is created using a high intensity excitation of a source of the atoms, and the process is configured to meet or deliver the conditions or parameters defined above.

We can also generalise the process used to create the sub-critical clusters:

A process of making clusters of atoms that are of sub-critical size, in which high intensity excitation of a source of those atoms leads to the rapid expansion of a plasma vapor cloud of those atoms; and in which the vapor conditions are controlled so that at least in some part or volume of the vapor cloud, the vapour cloud is in collisional mode, and stable clusters of subcritical size form at the interface between those volumes of the expanding vapour cloud which are in collisional mode, and regions outside of these collisional mode volumes which are not in (or at least not substantially in) a collisional mode.

A method of making stable sub-critical clusters using laser excitation of a fast flowing carbon-containing gas jet, where laser excitation results in extensive heating of the gas and gas decomposition, followed by fast expansion and rapid cooling of a carbon vapor cloud with the vapor cooling and expansion conditions controlled so that multiple stable clusters, each with a size less than the critical size, are condensed.

A method of making stable sub-critical clusters using fast compression and ionization of carbon-containing gas by means of rapid reconnection of magnetic field lines with subsequent gas decomposition, rapid expansion and cooling of a carbon vapor cloud with the vapor cooling and expansion conditions controlled so that multiple stable clusters, each with a size less than the critical size, are condensed.

Optional features:
  A laser evaporation process creates the high intensity excitation of the source.
  A laser beam is directed at a carbon containing substance (e.g. a bulk carbon target or carbon containing gas), and a high density carbon ion plasma is then created, carbon vapor condensation takes place in the plasma that results in formation of stable, carbon sub-critical, e.g. sub-nano, clusters.
  The process uses continuous wave or pulsed laser evaporation
  The process uses a laser-on-gas process with magnetic control of the plasma
  The stable, sub-critical clusters are as defined in Feature Set 2 below.
  The stable, sub-critical clusters are stable sub-nano carbon clusters as defined in Feature Set 3 below or nano-clusters as defined in Feature Set 7 below.

Note that any of the methods defined above may be used to make a material formed by the stable, sub-critical clusters, and that material may be further defined in Feature Set 4, Feature Set 5 and Feature Set 6 below. The material formed may therefore include both stable, sub-critical clusters and also stable over-critical clusters.

5B. Summary of Features of Sub-Critical Size Clusters

We generalize our description of sub-critical size clusters in the following Feature Set 2:

Feature Set 2: Defining a Sub-Critical Cluster

A stable, cluster of atoms of a specific element, with a cluster size that is less than the critical size for that specific element.

A stable, cluster of atoms of a specific element, formed in sub-critical nucleation process that has been controlled in order to preserve sub-critical nuclei that would otherwise be destroyed.

A stable, cluster of atoms of a specific element, with a cluster size that is less than the critical size for that specific element or has been formed in sub-critical nucleation process that has been controlled in order to preserve sub-critical nuclei that would otherwise be destroyed, and where the cluster has a substantially deformed spherical shape.

A stable, cluster of atoms of a specific element, with a size that is less than the critical size for that specific element or has been formed in sub-critical nucleation process that has been controlled in order to preserve sub-critical nuclei that would otherwise be destroyed and where the cluster has a substantially amorphous, non-crystalline structure.

The stable, cluster of atoms as defined above, where the atoms are carbon.

The stable, cluster of atoms as defined above, where the atoms are carbon and are formed into, in one example, an amorphous 64 carbon structure.

The stable, cluster of atoms as defined above, where the atoms are silicon.

A stable, cluster of atoms of a specific element, with a size that is less than the critical size for that specific element, produced using a method as defined in Feature Set 1 above.

5C. Summary of Features of Carbon Sub-Nano Clusters

We generalize our description of the specific case where the atoms in the clusters are carbon (and hence we have carbon sub-nano clusters) in the following Feature Set 3:

Feature Set 3: Defining a Carbon Sub-Nano Cluster

A stable, carbon sub-nano cluster with a size of less than 1 nm.

A stable, carbon sub-nano cluster with a size between 0.3/0.4 nm and 0.7 nm.

A stable, carbon sub-nano cluster, formed in a sub-critical nucleation process that has been controlled in order to preserve sub-critical nuclei that would otherwise be destroyed.

A stable, carbon sub-nano cluster with a size of less than 1 nm, and where the sub-nano cluster has a substantially spherical or a deformed spherical shape.

A stable, carbon sub-nano cluster with a size of less than 1 nm and a substantially amorphous, non-crystalline structure.

The stable, sub-nano cluster of atoms as defined above, where the atoms are carbon and are formed into, as one example, an amorphous 64 carbon structure.

A stable, carbon sub-nano cluster produced using a method as defined in Feature Set 1 above.

A stable, carbon sub-nano cluster with the features defined in Feature Set 2 above.

5D. Summary of Features of Materials Comprising Multiple Sub-Critical Size Clusters We generalize our description of the material comprising multiple sub-critical size clusters in the following Feature Set 4:

Feature Set 4: Defining the Material that Comprises Multiple Sub-Critical Size Clusters A material comprising multiple stable, clusters of atoms of a specific element, in which at least some of these clusters each have a size that is less than the critical size for that specific element.

A material comprising multiple stable, clusters of atoms of a specific element, in which at least some of these clusters are formed in sub-critical nucleation process that has been controlled in order to preserve sub-critical nuclei that would otherwise be destroyed.

A material comprising multiple stable, clusters of atoms of a specific element, in which at least some of these clusters have a size that is less than the critical size for that specific element and these clusters each have a substantially amorphous, non-crystalline structure.

A material comprising multiple stable, clusters of atoms of a specific element, in which at least some of these clusters have a size that is less than the critical size for that specific element and these clusters each have a substantially amorphous, non-crystalline structure, and the material also has a substantially amorphous, non-crystalline structure.

A material comprising multiple stable, clusters of atoms of a specific element, in which at least some of these clusters have a size that is less than the critical size for that specific element and also have a substantially spherical or a deformed spherical shape.

A material comprising multiple stable, clusters of atoms of a specific element, in which at least some of these clusters have a size that is less than the critical size for that specific element and in which the clusters self-assemble to form, fully or in part, the material.

A material comprising multiple stable, clusters of atoms of a specific element, in which at least some of these clusters have a size that is less than the critical size for that specific element and in which the clusters consistently and repeatably self-assemble in the same manner to form, fully or in part, the material.

A material comprising multiple stable, clusters of atoms of a specific element, in which each cluster has a size that is less than the critical size for that specific element and is produced using a method defined in Feature Set 1 above.

A material as defined in this Feature Set 4, when produced using a method defined in Feature Set 1 above.

A material as defined above, in which the atoms are carbon atoms.

A material as defined above, in which the atoms are silicon atoms.

5E. Summary of Features of Materials Comprising Multiple Carbon Sub-Nano Clusters And we generalize our description of the material comprising multiple sub-critical size clusters for the specific case where the atoms in the clusters are carbon (and hence we have a material including carbon sub-nano clusters) in the following Feature Set 5:

Feature Set 5: Defining the Material that Comprises Multiple Carbon Sub-Nano Clusters A material comprising multiple stable, carbon sub-nano clusters, each with a size of less than 1 nm.

A material comprising multiple stable, carbon sub-nano clusters, each formed in sub-critical nucleation process that has been controlled in order to preserve sub-critical nuclei that would otherwise be destroyed.

A material comprising multiple stable, carbon sub-nano clusters, with a size between 0.3/0.4 nm and 0.7 nm.

A material comprising multiple stable, carbon sub-nano clusters, and where at least some of the sub-nano clusters have a substantially amorphous, non-crystalline structure.

A material comprising multiple stable, carbon sub-nano clusters, and where at least some of the sub-nano clusters have a substantially amorphous, non-crystalline structure, and the material also has a substantially amorphous, non-crystalline structure A material comprising multiple stable, carbon sub-nano clusters, and where at least some of the sub-nano clusters have a substantially spherical or a deformed spherical shape.

A material comprising carbon sub-nano clusters, each with a substantially amorphous, non-crystalline structure, in which the sub-nano clusters self-assemble to form, fully or in part, the material.

A material comprising carbon sub-nano clusters in which with pores between the carbon sub-nano clusters are sized to permit ions of a selected element to freely or, substantially readily, move in and out of the pores.

A material comprising carbon sub-nano clusters in which with pores between the carbon sub-nano clusters are sized to permit ions of a selected element to freely or, substantially readily, move in and out, with a minimum of 60-150 pm for metal ion accumulation.

A material comprising carbon sub-nano clusters in which the material has compared to, for example, hard carbon and activated carbon materials, a very moderate specific surface area of between 6-8 m$^2$/g, and simultaneously has a high ionic conductivity, such as $10^{-4}$ S/cm, which contributes to very high levels and high speed of ion accumulation in the carbon sub-nano-cluster material.

A material comprising carbon sub-nano clusters in which the material has, compared to, for example, hard carbon and activated carbon materials, a very moderate specific surface area of between 6-8 m$^2$/g, and preferably 7 m$^2$/g (measured with N$_2$ physisorption), and simultaneously has a high ionic conductivity, such as $10^{-4}$ S/cm, which contributes to very high levels and high speed of ion (Li-ion) accumulation in the carbon sub-nano-cluster material.

A material comprising carbon sub-nano clusters, each with a substantially amorphous, non-crystalline structure, in which the clusters accumulate metal ions in the material volume, i.e. on the surface of the carbon sub-nano clusters, and ion accumulation can therefore proceed at high speed to deliver an electrochemical capacity that is high.

A material comprising carbon sub-nano clusters in which with the material is formed into a desired shape or configuration.

A material comprising carbon sub-nano clusters in which with the material is formed or deposited on a substrate such as carbon paper, conducting (e.g. carbon and metal) wires, metal foam, and oxides. The material can then be deposited as a layer onto the substrate, with the layer thickness being in the range from approximately 10 nm to 500 μm; and in some cases can be separated from the substrate, and the separated material can be further milled to get material powder; this can be used in a supercapacitor electrode.

A material as defined in this Feature Set 5, when produced using a method defined in Feature Set 1 above.

5F. Summary of Special Properties of Material Comprising Multiple Carbon Sub-Nano Clusters We have seen above that carbon sub-nano clusters have some unusual properties. We generalise and expand our description of these unusual properties in the following Feature Set 6:

Feature Set 6: Special Properties of the Material Comprising Multiple Carbon Sub-Nano Clusters.

A carbon material wherein the specific surface area is between 6.6-8.7 m²/g, and the pore size distribution is bimodal with dominant pore sizes of between 0.85 nm and 3.5 nm.

A carbon material having a hardness from 0.1 GPa to 30 GPa.

A carbon material having a hardness that can be varied between approximately 0.1 GPa to 20 GPa by varying the conditions or parameters of the manufacturing process defined in Feature Set 1.

A carbon material having a hardness that can be varied between approximately 0.1 GPa to 20 GPa by varying one or more of the following parameters: residual pressure, temperature, substrate type, doping.

A carbon material having a hardness of at least approximately 20 GPa.

A carbon material having a hardness of under 1 GPa.

A carbon material having a hardness of approximately 0.1 GPa.

A carbon material that is more resistive to oxidation by heating in air than glassy carbon.

A carbon material that is resistive to oxidation in air up to the temperature of 1500° C.

A carbon material that is more resistive to chemical oxidation than glassy carbon.

A carbon material possessing electron conductivity in the range from 0.01 to 0.1 S/cm at 20° C., where this electron conductivity increases, for example, increasing irreversibly by three orders of magnitude under the material annealing at 550° C.

A carbon material possessing Li-ion conductivity of at least $10^{-4}$ S/cm at 20° C.

A carbon material with a specific differential capacity of lithium accumulation that is greater than 500 F/g at the voltage over 1.0 V vs L/L⁺, and when the carbon material is, for example, incorporated into an electrode of a lithium-based energy storage device.

A carbon material with a specific differential capacity of lithium accumulation that is greater than 1000 F/g at the voltage over 1.0 V vs L/L⁺ when the carbon material is, for example, incorporated into an electrode of a lithium-based energy storage device.

A carbon material with a specific differential capacity of lithium accumulation that is greater than 2000 F/g at the voltage over 1.0 V vs L/L⁺ when the carbon material is, for example, incorporated into an electrode of a lithium-based energy storage device.

A carbon material modified by doping with an element with a valence different from that of carbon, to provide variable properties of the said carbon material such as control of capacity and operation voltage window under material charge and discharge by L⁺ ions.

A carbon material having a specific Li-ion storage capacity that does not decrease significantly with an increasing C rate, such that C rate is not a limiting factor in the selection of this material for a lithium-based energy storage device.

A carbon material having a specific Li-ion storage capacity that decreases from its intrinsic value (measured at 0.1 C rate) for 8% at 1 C rate, for 16% at 5 C rate, for 20% at 10 C rate, for 28% at 20 C rate, and for 36% at 50 C rate when the said carbon material is incorporated into an electrode of the lithium-based energy storage device.

A carbon material having a specific Li-ion storage capacity that decreases less than 10% (from its intrinsic value at 0.1 C rate) at a 1 C rate, and less than 20% at a 5 C rate.

A carbon material having a specific Li-ion storage capacity that decreases less than 20% (from its intrinsic value at 0.1 C rate) at a 5 C rate.

A carbon material having a specific Li-ion storage capacity that decreases less than 30% (from its intrinsic value at 0.1 C rate) at a 10 C rate.

A carbon material having a specific Li-ion storage capacity that decreases less than 40% (from its intrinsic value at 0.1 C rate) at a 20 C rate.

A carbon material having a specific Li-ion storage capacity that decreases less than 50% (from its intrinsic value at 0.1 C rate) at a 50 C rate.

The carbon material defined in this Feature Set 6, in which the carbon material itself is as further defined in Feature Set 4 or 5 above.

The carbon material as defined in this Feature Set 6, when produced using a method defined in Feature Set 1 above.

The carbon material defined in this Feature Set 6, in which the carbon material includes stable, sub-critical clusters as defined in Feature Set 2, or the stable sub-nano carbon clusters as defined in Feature Set 3 or the nano-clusters as defined in Feature Set 7.

5G. Extending these Feature Sets to Nano-Clusters

Feature Set 7: Extending these Feature Sets to Nano-Clusters

Whilst the Feature Sets above focus on sub-critical clusters, and sub-nano clusters, we can generalize to a 'nano-cluster' (namely a cluster that may be wholly sub-critical in size, or partly sub-critical and partly over-critical in size, or wholly over-critical in size). We can generalise also to a 'nano-cluster material' (namely a material made of clusters that may each be wholly sub-critical in size, or partly sub-critical in size and partly over-critical in size, or wholly over-critical in size).

The method of Feature Set 1, in which the method steps are used to make stable sub-critical clusters, as well as stable nano-clusters.

The method of Feature Set 1, in which the method steps are used to make stable nano-clusters, and not stable sub-critical clusters.

Nano-clusters may have some or all of the features of sub-critical clusters; we generalize as follows:

A stable, nano-cluster of atoms where the nano-cluster has a substantially spherical or a deformed spherical shape.

A stable, nano-cluster of atoms where the nano-cluster has a substantially amorphous, non-crystalline structure.

Nano-cluster materials may have some or all of the features of sub-critical materials; we generalize as follows:

A material comprising multiple stable, nano-clusters of atoms, and these clusters each have a substantially amorphous, non-crystalline structure.

A material comprising multiple stable, nano-clusters of atoms, and these nano-clusters each have a substantially amorphous, non-crystalline structure, and the material also has a substantially amorphous, non-crystalline structure.

A material comprising multiple stable, nano-clusters of atoms, in which the nano-clusters self-assemble to form, fully or in part, the material.

A material comprising multiple stable, nano-clusters of atoms and in which the nano-clusters consistently and repeatably self-assemble in the same manner to form, fully or in part, the material.

Section 6: Applications

Whilst the applications for sub-critical size clusters and the materials that include those clusters may prove to be as broad and deep as the applications for nanotechnology, in this section state some of the most important applications.

6A. An Energy Storage Device

An energy storage device comprising multiple stable sub-critical size clusters of atoms. The cluster is further defined in Section 5B (Feature Set 2) above.

An energy storage device comprising multiple stable sub-nano clusters of carbon atoms. The cluster is further defined in Section 5C (Feature Set 3) above.

An energy storage device comprising material that comprises multiple Sub-Critical Size Clusters, as defined in Section 5D (Feature Set 4) above.

An energy storage device comprising material that comprises multiple carbon sub-nano clusters as defined in Section 5E (Feature Set 5) or Section 5F (Feature Set 6) above or nano-clusters as defined in Section 5G (Feature Set 7) above.

An energy storage device comprising material that comprises multiple silicon sub-critical clusters as defined in Section 5E (Feature Set 5) above.

As noted in Section 3 above, the clusters or material may: be formed on or form part of an electrode; be formed on or form part of an electrode that is part of a solid state battery; serve as an ion host or matrix; serve as an ion host or matrix in a solid state battery and that allows solid state phase reactions to occur at an electrode; be formed on or form part of an electrode to prevent an electrolyte from passing into that electrode; serve as a protection layer preventing unwanted interaction between an electrode material and a liquid electrolyte; be formed on or form part of an electrode to provide ionic and electronic conductivity and at the same time a protection layer stopping liquid electrolyte from reaching a part of the electrode that is covered by the clusters or material; provide high specific capacity persisting alongside with high ionic and high electronic conductivities.

A car, van, truck, motor cycle, motorized scooter, bicycle, aircraft, drone, satellite, smartphone, smartwatch, mobile phone, tablet, laptop, computer, electronic device, or any other kind of vehicle or device including an energy storage device as defined in this Section 6A.

6B. Grinding Powder

A grinding powder comprising multiple stable sub-critical size clusters of atoms. The cluster is further defined in Section 5B (Feature Set 2) above.

A grinding powder comprising multiple stable sub-nano clusters of carbon atoms. The cluster is further defined in Section 5C (Feature Set 3) above.

A grinding powder comprising material that comprises multiple sub-critical size clusters, as defined in Section 5D (Feature Set 4) above.

A grinding powder comprising material that comprises multiple carbon sub-nano clusters as defined in Section 5E (Feature Set 5) or Section 5F (Feature Set 6) above or nano-clusters as defined in Section 5G (Feature Set 7).

6C. A Supercapacitor Type Energy Storage Device

A supercapacitor comprising multiple stable sub-critical size clusters of atoms. The cluster is further defined in Section 5B (Feature Set 2) above.

A supercapacitor comprising multiple stable sub-nano clusters of carbon atoms. The cluster is further defined in Section 5C (Feature Set 3) above.

A supercapacitor comprising material that comprises multiple Sub-Critical Size Clusters, as defined in Section 5D (Feature Set 4) above.

A supercapacitor comprising material that comprises multiple carbon sub-nano clusters as defined in Section 5E (Feature Set 5) or Section 5F (Feature Set 6) above or nano-clusters as defined in Section 5G (Feature Set 7) above.

The clusters or material may be formed on or form part of a supercapacitor electrode.

A car, van, truck, motor cycle, motorized scooter, bicycle, aircraft, drone, satellite, smartphone, smartwatch, mobile phone, tablet, laptop, computer, electronic device, or any other kind of vehicle or device including a supercapacitor as defined in this Section 6C or Section 6D below.

We will now expand on some specific features of supercapacitors and batteries.

6D.1 Lithium Ion Supercapacitor

The supercapacitor defined in Section 6C above may be a lithium ion supercapacitor, in which Li ions accumulate in the material as defined in Section 5D or Section 5E or Section 5F above. There is no intercalation; accumulation is the key mechanism.

the electrode is not activated carbon but is instead the material that comprises multiple carbon sub-nano clusters, as defined in Section 5E (Feature Set 5) or Section 5F (Feature Set 6) above.

charge/discharge rate exceeds 100 C and can reach or exceed 200 C, going or even higher, such as 600 C there is substantially no or very limited performance degradation over 5000 or even 10,000 charge/discharge cycles lithium metal is one terminal and the carbon material is the other terminal; and the electrolyte is in the group of lithium sulphides or lithium oxides or lithium phosphates; ($Li_3PS_4$ (a sulfide) and $Li_{1.3}Al_{0.3}Ti_{1.7}(PO_4)_3$ (a phosphate) as well as $Li_7La_3Zr_2O_{12}$ (an oxide); or lithium polymer, or lithium argyrodite or phosphorous sulphide.

6D.2 Magnesium Supercapacitor

The supercapacitor defined in Section 6C above may be a magnesium ion supercapacitor, in which Mg ions accumulate in the material as defined in Section 5D or Section 5E or Section 5F above. There is no intercalation; accumulation is the key mechanism.

Magnesium can be one terminal and the material as defined in Section 5D or Section 5E or Section 5F above is the other terminal, and the electrolyte is magnesium-scandium-selenide $MgSc_2Se_4$ or a polymer.

Magnesium can be one terminal and the material as defined in Section 5D or Section 5E or Section 5F above is the other terminal and is covered with a liquid electrolyte.

6D.3 Aluminium Supercapacitor

The supercapacitor defined in Section 6C above may be an aluminium ion supercapacitor, in which Al ions, or complex aluminium containing ions, such as $AlCl_4^-$, accumulate in the material as defined in Section 5D or Section 5E or Section 5F above.

aluminium can be one terminal and the carbon sub-nano cluster system is the other terminal; and the electrolyte is an aluminium sulphide or aluminium oxide (alumina), $Al_2O_3$, or Manganese dioxide $MnO_2$ aluminium can be one terminal and the material as defined in Section 5D or Section 5E or Section 5F above is the other terminal and is covered with a liquid electrolyte.

6D.4 Solid Electrolyte and Solid Battery

The supercapacitor defined in Section 6C above may include material as defined in Section 5D or Section 5E or Section 5F above that is covered with a solid electrolyte.

As noted in Section 3 above, the carbon nano-cluster material, having both electronic and high ionic conductivities, can be successfully used in designing highly efficient all-solid-state batteries. In one realization of such a battery, a layer of carbon nano-cluster material can be deposited on a current collector to form a first battery electrode. After that, a layer of solid electrolyte material, which has very low electronic conductivity, is deposited over the layer of carbon nano-cluster material (e.g. using laser enhanced or pulsed laser deposition). Finally, an opposite (second) battery electrode (anode or cathode) is formed. In the resulting element the layer of solid electrolyte material provides electrical separation of two battery electrodes. To re-cap on Section 3, a lithium ion solid state battery comprises (a) a cathode made of carbon nano-cluster material; (b) a solid state electrode, such as $Li_7La_3Zr_2O_{12}$ (LLZO); and (c) a Li foil anode.

The advantage of such a battery stems from a unique feature of the carbon nano-cluster material, that is high specific capacity persisting alongside with high ionic and high electronic conductivities.

In another realization of all-solid-state battery the carbon nano-cluster material can be deposited simultaneously with solid electrolyte material to form a layer of composite electrode. In this case the solid electrolyte may form a self-assembled network around the carbon sub-nano clusters to elucidate ion-migration to all or substantially all of the surface area of the carbon. After that a solid electrolyte layer is deposited over the composite electrode layer and the second electrode is then formed. An additional advantage of this battery design may be an improvement of ionic and electronic contact between the composite electrode layer and the solid electrolyte layer.

In another realization of all-solid-state battery, the carbon nano-cluster material can be deposited simultaneously with sulfur to form a layer of composite cathode electrode. After that a solid electrolyte layer is deposited. Finally, the anode electrode layer is formed. An advantage of this battery design, compared to a similar one but with only carbon nano-cluster material in the cathode layer, is the enhanced operation voltage and thus enhanced specific energy stored. This advantage is provided specifically by the addition of sulfur to the cathode electrode layer. To re-cap on Section 3, the lithium sulfur battery comprises (a) a solid state cathode made of the carbon nano-cluster material, mixed with sulfur and deposited on an Al foil, and covered with a protective layer of the carbon nano-cluster material that is impermeable to liquid electrolyte; (b) a carbonate based liquid electrolyte; (c) a separator; and (d) a Li foil anode.

We note that the distinctive property of the carbon nano-cluster material which is a combination of high specific capacity, high ionic and high electronic conductivities can be used in various ways, not limited by the above realization examples, with the aim to improve the characteristics of the batteries, including those with solid and liquid electrolytes.

6D.5 Linear Substrate for Sub-Nano Cluster Material

The material as defined in Section 5D or Section 5E or Section 5F above may be formed onto a substrate that is a conductive wire or fibre or other linear or elongate conductive structure. In this form, it can be used in battery or supercapacitor or other form of energy storage device.

Substrate is any electrically conductive material

Substrate is any conductive micro-porous material

Wire is a metallic wire

Fibre is a conductive carbon fibre

Fibre is a conductive metal oxide fibre.

Wire or fibre or other elongate structure is covered with a carbon sub-nano cluster Substrate is a pair of wires, fibres or other elongate electrically conductive structures, and a solid electrolyte covers each of the elongate electrically structures before the pair of substrates are combined.

A solid electrolyte fills in the gaps between the pair of wires, fibres or other elongate electrically conductive structures.

The pair of wires, fibres or other elongate electrically conductive structures are twisted together.

The solid electrolyte comprises carbon sub-nano clusters that have formed into a self-assembled mono-layer, or multiple self-assembled mono-layers.

The substrate is made from one or more of: aluminium, copper, nickel, carbon, porous carbon.

Carbon sub-nano clusters form a self-assembled mono-layer, or multiple self-assembled mono-layers on wire or fibre or other elongate structure Note that substrates can be any porous conductive substrate we can coat our sub-nano clusters. Notable options are 3D structures consisting or comprising of porous aluminium, copper, nickel, carbon, etc. coated with sub-nano carbon clusters.

The invention claimed is:

1. A method for manufacturing stable sub-critical size clusters:
   applying heat to a sample of carbon within a chamber, the applied heat resulting in ionization of the carbon into a vapor cloud within the chamber,
   wherein the carbon vapor cloud experiences an expansion and cooling within the chamber, the temperature and volume of the vapor cloud within the chamber controlled such that at least a portion of the vapor cloud enters a collisional mode; and
   forming clusters of carbon atoms during vapor condensation within the chamber, wherein the carbon clusters form within the chamber at the interface of the portion of the vapor cloud that is in collisional mode and a portion of the vapor cloud that is not in collisional mode, wherein clusters of the carbon atoms are each a solidified nucleus of sub-critical size wherein the sub-critical size is a sub-nano size.

2. The method of claim 1, wherein the temperature and volume of the vapor cloud are controlled so that the multiple stable clusters are formed within the chamber during a sub-critical nucleation process.

3. The method of claim 2, wherein the stable clusters formed within the chamber during the sub-critical nucleation process are condensed forming bulk material.

4. The method of claim 1, wherein heat is applied by a pulsed laser evaporation process.

5. The method of claim 1, wherein the carbon vapor cloud expansion and cooling within the chamber occurs during a time period that allows clusters to form and ends before subcritical sized clusters disappear through an atomic exchange with a vapor phase.

6. The method of claim 1, wherein the carbon vapor cloud expansion and cooling within the chamber occurs during a time period between 2-4 microseconds.

7. The method of claim 1, wherein one of more of the clusters of carbon atoms have a diameter of between 0.3 to 0.7 nanometers.

8. The method of claim 1, wherein one of more of the clusters of carbon atoms have a diameter of between 0.7 nm to 1 nanometers.

9. The method of claim 1, wherein the carbon sub-critical clusters have a deformed spherical shape including an amorphous, non-crystalline structure.

10. The method of claim 1, wherein a portion of generated cluster materials are over-critical in size, wherein the over critical size is larger than 1 nm.

* * * * *